United States Patent [19]

Hammond et al.

[11] 4,103,257
[45] Jul. 25, 1978

[54] AZAQUINOLONE DYE LASERS

[75] Inventors: Peter R. Hammond, Livermore; Ronald L. Atkins, Ridgecrest; Ronald A. Henry, China Lake; Aaron N. Fletcher, Ridgecrest, all of Calif.

[73] Assignee: The United States of America as represented by the United States Department of Energy, Washington, D.C.

[21] Appl. No.: 689,764

[22] Filed: May 25, 1976

[51] Int. Cl.² ............................................. H01S 3/20
[52] U.S. Cl. ............................. 331/94.5 L; 260/295 N; 260/296 N
[58] Field of Search ............ 331/94.5 L; 260/295 N, 260/296 N (U.S. only), 256.4 F, 288 CF

[56] References Cited
U.S. PATENT DOCUMENTS 4,026,898   5/1977   Henry et al. .................. 331/94.5 L Primary Examiner—William L. Sikes
Assistant Examiner—Marcus S. Rasco
Attorney, Agent, or Firm—Dean E. Carlson; Roger S. Gaither; Irene S. Croft

[57] ABSTRACT

A dye laser comprising a laser dye solution of a compound having the general structure:

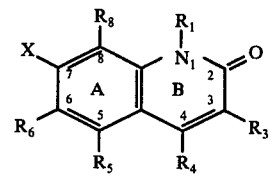

wherein at least one of the 5, 6 and 8 ring positions is occupied by a nitrogen atom in lieu of the corresponding CR group and X is OH, alkoxy, or amino including amino substituted by at least one of the following: alkyl, aryl, acyl, aracyl, a group which taken together with the nitrogen atom of the amino group forms a heterocyclic ring, or part of one or two 5 or 6 membered aliphatic heterocyclic rings attached to ring A at positions 6 or 8 or both depending on where the N in ring A is located. $R_1$, $R_3$, $R_4$, $R_5$, $R_6$ and $R_8$ are hydrogen or other groups as defined below. The compounds lase in the blue to near ultraviolet region.

17 Claims, No Drawings

AZAQUINOLONE DYE LASERS

BACKGROUND OF THE INVENTION

The invention described herein was made in the course of or under Interagency Agreement No. E(04-3)1019 between the Energy Research and Development Administration and the United States Naval Weapons Center.

This invention relates to dye lasers. More particularly, this invention relates to dye lasers utilizing a new class of lasing compounds, specifically, a class of azaquinolone-2 lasing compounds.

The fact that complex organic dye molecules can be induced to emit coherent laser light is well known and is described in, for example, M. R. Kagan, G. I. Farmer, and B. G. Huth, "Organic Dye Lasers", *Laser Focus* 4, pp 26–33, September 1968, and P. Sorokin, "Organic Lasers" *Scientific American*, pp 30–40, February 1969. The active medium of a typical organic dye laser consists of a dilute solution of the organic material dissolved in a common solvent such as water or alcohol. However, it is not necessary to use liquid solvents with the organic molecules; solid matrices, such as polymethyl methacrylate can also be used. The term "dye" laser is derived from several classes of organic dye compounds in which lasing has been produced. Actually, a great number of compounds useful in dye lasers do not fit the general classification of organic dyes.

A major advantage of the organic dye laser is its tunability, that is, the output of an individual laser can be changed continuously over a smaller range of wavelengths. This feature makes the dye laser particularly suitable for use in isotope separation processes based on selective photoexcitation of a particular isotopic species. A general description of laser isotope separation processes is given in C. Bradley Moore, "The Application of Lasers to Isotope Separation", *Accounts of Chemical Research* 6, pp 323–328, 1973. The narrow bandwidth and exact wavelength requirements of the excitation source generally require that a finely tunable laser be used.

Efficient lasers which operate in the blue to near ultraviolet region, particularly in the 350–400 nm region, are desirable for specific applications, particularly for specific isotope separation processes such as uranium isotope separation. At present, the most efficient laser dyes known with respect to low threshold, high slope efficiency, long-pulse, and continuous-wave (CW) operation are contained within the classes of the xanthenes, oxazines, carbazines, carbopyronins, and coumarins. The most blue-shifted of these reported to date is 7-amino-4-methyl-coumarin (Eastman Kodak dye coumarin 120) which lases at 440 nm in methanol.

Materials already known to lase in the 350 to 400 nm region such as quaterphenyl, diphenyl oxazole, diphenyl stilbene, and bis(phenyloxazol-2-yl)-benzene do not have low thresholds even for short-pulse, fast risetime flashlamp excitation, although some lase efficiently under nitrogen laser stimulation.

Two compounds derived from 2-hydroxyquinoline (2-hydroxy-4-methyl-7-aminoquinoline and the N-dimethyl derivative) have been found to lase in the violet region of the spectrum when pumped by a flashlamp (Srinivason, R., "New Materials for Flash-Pumped Organic Lasers", *IEEE J Quantum Electron.* Vol. QE-5, 1969, pp 552–53). The named compounds, like the parent compound, exist predominantly as the quinoline-2 (carbostyril) tautomers.

O. Seide, *Chem. Ber.* 59, 2465 (1926) describes the preparation of 7-amino-2-hydroxy-4-methyl-1,8-naphthyridine. V. Petrow, E. L. Rewald and B. Sturgeon, *J. Chem. Soc.* 1407 (1947) describes the preparation of 7-acetamido-2-hydroxy-4-methyl-1,8-naphthyridine. A. Mangini and M. Colonna, *Gazzetta Chimica Italiana* Vol. 72 183 (1942) describes the preparation of 2-hydroxy-4-phenyl-7-amino-1,8-naphthyridine, 2,7-dihydroxy-4-phenyl-1,8-naphthyridine and 2-hydroxy-4-phenyl-7-acetylamino-1,8-naphthyridine. The 2-hydroxy-1,8-naphthyridines exist as the 8-azaquinolone-2 tautomers. The aforementioned 1,8-naphthyridines were investigated for their biological and pharmacological properties.

SUMMARY OF THE INVENTION

The present invention provides a dye laser comprising a lasing solution of a 7-substituted azaquinolone-2 in which the aza nitrogen occupies at least one of the 5,6 and 8 ring positions. The 7-substituent is hydroxy, alkoxy, amino or substituted amino. Substituents may be attached to other ring positions as defined in detail below. The present lasing compounds are aza analogs of corresponding quinolone compounds and, hence, are named herein "azaquinolone" compounds. The present dye lasers lase in the blue to near ultraviolet region.

It is, therefore, an object of this invention to provide a dye laser, particularly a dye laser which lases in the blue to near ultraviolet region.

It is a further object of this invention to provide a new class of lasing dyes, particularly dyes which lase in the blue to near ultraviolet region.

Still another object of this invention is to provide a method for producing coherent laser radiation, particularly at a wavelength in the blue to near ultraviolet region.

Other objects and advantages will become apparent from the following detailed description.

DETAILED DESCRIPTION OF THE INVENTION

The dye laser of the present invention includes a laser dye solution comprising a lasing concentration in a non-interfering solvent of a compound having the following general structure:

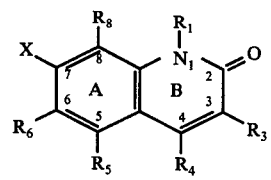

wherein a nitrogen atom is located in at least one of the 5, 6 and 8 positions in lieu of the corresponding CR group; $R_1$ is hydrogen, alkyl, substituted alkyl such as alkyl aryl or alkyl ester, aryl, or substituted aryl such as alkaryl, alkyl ester or haloalkyl, aryl, substituted aryl such as tolyl, naphthyl, arylhalide or alkoxyaryl; $R_3$ is hydrogen, alkyl, substituted alkyl such as alkaryl, alkyl ester or haloalkyl, aryl, substituted aryl such as tolyl, naphthyl or alkoxyaryl, cyano, or carboxyl; $R_4$ is hydrogen, alkyl, substituted alkyl such as alkaryl, alkyl ester or haloalkyl, aryl, substituted aryl such as tolyl, naphthyl or alkoxyaryl, cyano, carboxyl, hydroxy, or alkoxy; $R_5$, $R_6$ and $R_8$ are independently hydrogen, alkyl, hydroxy, alkoxy, halogen, alkylsulfonyl, arylsulfonyl, or sulfonamide; and X is hydroxy, alkoxy, amino, or substituted amino. The term "substituted amino" is used herein to include alkylamino, arylamino, acylamino, aracylamino, a heterocyclic nitrogen ring of preferably 5 or 6 members, and a group which taken together with $CR_6$ and/or $CR_8$ forms one or two 5 or 6 membered aliphatic heterocyclic rings attached to ring A.

In the above formula, $R_1$ is preferably hydrogen or lower alkyl; $R_3$ is preferably hydrogen or lower alkyl; $R_4$ is preferably hydrogen, hydroxy, lower alkoxy, lower alkyl, or halo-substituted lower alkyl; $R_5$ and $R_6$ are preferably hydrogen; X is preferably hydroxy, lower alkoxy, amino, or lower alkylamino; and a nitrogen atom preferably occupies the 8 ring position. The term "lower alkyl" is used to denote alkyl groups of less than 8 carbon atoms. Particularly suitable lasing compounds of the present invention are the 8-azaquinolone-2 compounds wherein $R_1$ and $R_3$ are independently hydrogen or methyl; $R_4$ is hydrogen, hydroxy, methyl, methoxy, or halomethyl such as fluoromethyl; $R_5$ and $R_6$ are hydrogen; and X is hydroxy, methoxy, amino, methylamino, or dimethylamino.

The laser dye solution is operably coupled with a pumping energy source capable of producing stimulated emission of the dye solution. Suitable pumping energy sources are well known to those in the art and include, for example, flashlamps and lasers, such as a nitrogen laser.

Suitable non-interfering solvents for use in the present dye laser are also well known in the art. Such common solvents as water and ethanol can be used; a solid matrix such as polymethyl methylacrylate can also serve. The solution may be saturated with oxygen or an inert gas. Some lasing dyes can also be used in the form of its water-soluble salt.

The present invention also provides a novel class of compounds having the following structure:

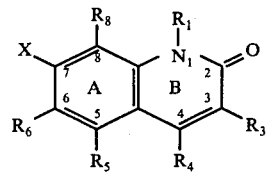

wherein at least one of the 5, 6 and 8 ring positions is occupied by a nitrogen atom in lieu of the corresponding CR group and X, $R_1$, $R_3$, $R_4$, $R_5$, $R_6$ and $R_8$ are groups as described above with the proviso that when a nitrogen atom occupies the 8 ring position, X is $NH_2$ or acylamino and $R_1$, $R_3$, $R_5$ and $R_6$ are hydrogen, then $R_4$ is hydrogen, alkyl of at least 2 carbon atoms, substituted alkyl such as aralkyl, alkyl ester or haloalkyl, cyano, carboxyl, hydroxy, or alkoxy, and when a nitrogen atom occupies the 8 ring position, X is OH and $R_1$, $R_3$, $R_5$ and $R_6$ are hydrogen, then $R_4$ is hydrogen, alkyl, substituted alkyl such as aralkyl, alkyl ester or haloalkyl, cyano, carboxyl, hydroxy, or alkoxy.

A tabular summary of compounds illustrative of the present invention and a very brief description of the type of reaction employed to synthesize the compound is given in Table 1. Detailed synthesis procedures for selected compounds follows Table 1.

TABLE 1

SUBSTITUTED 8-AZA-2-QUINOLONES

| Compound No. | $R_1$ | $R_3$ | $R_4$ | $R_5$ | $R_6$ | X | Meth.[a] | Yield, % | m.p., °C | Recrystallized from |
|---|---|---|---|---|---|---|---|---|---|---|
| 1 | H | H | H | H | H | $NH_2$ | D | Low | > 360 | Sublimed |
| 2 | H | $CH_3$ | $CH_3$ | H | H | $NH_2$ | A | 14 | > 320 | Dilute HCl |
| 3 | $CH_3$ | H | $CH_3$ | H | H | $NHCH_3$ | B | — | 120–121 | n-Hexane |
| 4 | $CH_3$ | H | $CH_3$ | H | H | $N(CH_3)_2$ | B | 20 | 145.5–146.5 | Cyclohexane |
| 5 | $CH_3$ | $CH_3$ | $CH_3$ | H | H | $NHCH_3$ | B | — | 133–134 | Cyclohexane |
| 6 | H | H | $CF_3$ | H | H | $NH_2$ | A | 89 | > 320 | $DMSO^b$ |
| 7 | $CH_3$ | H | $CF_3$ | H | H | $N(CH_3)_2$ | B | 33 | 167–168 | 1:1 Cyclohexane-benzene |
| 8 | H | H | HO | H | H | $NH_2$ | C | 96 | > 320 | DMSO and ethanol |
| 9 | H | $CH_3$ | HO | H | H | $NH_2$ | C | 96 | — | — |
| 10 | H | H | $CH_3O$ | H | H | $NH_2$ | E | 68 | > 320 | DMSO and ethanol |
| 11 | $CH_3$ | H | $CH_3O$ | H | H | $NHCH_3$ | B | — | 136–137 | Cyclohexane |
| 12 | $CH_3$ | H | $CH_3O$ | H | H | $N(CH_3)_2$ | B | <10 | 177–178 | 7:3 Cyclohexane-benzene |
| 13 | $CH_3$ | $CH_3$ | $CH_3O$ | H | H | $NHCH_3$ | B | — | 135–137 | Cyclohexane |
| 14 | $CH_3$ | $CH_3$ | $CH_3O$ | H | H | $N(CH_3)_2$ | B | Low | 114.5–115.5 | n-Hexane |
| 15 | $CH_3$ | H | HO | H | H | $N(CH_3)_2$ | F | — | 297–299 | DMSO |
| 16 | H | H | $CH_3$ | H | H | HO | A | 76 | > 320 | Water |
| 17 | H | $CH_3$ | $CH_3$ | H | H | HO | A | 20 | > 320 | DMSO and ethanol |

[a]Methods of preparation. (A) Equimolar amounts of a suitably substituted 2,6-diamino- or 2-amino-6-hydroxy-pyridine and the β-ketoester were heated at 150–160° for 16–18 hr; (B) the amino- or hydroxy-8-azaquinolone-2 and excess trialkyl phosphate were heated at 195–200° for 5 hr; (C) equimolar amounts of 2,6-diamino-pyridine and a malonic ester were heated in diphenylether at 170–180° for 1–2 hr, then temperature raised slowly to 240–250°; (D) procedure of S. Carboni, A. Da Settimo and D. L. Ferrarini, Gazz. Chim, Ital. 95, 1492 (1965); (E) dimethyl sulfate on basic aqueous solution of corresponding hydroxy compound; (F) hydrolysis of 4-methoxy compound in 4N hydrochloric acid.
[b]Dimethylsulfoxide.

The present compounds can also be prepared in the form of their salts.

Preparation of 7-dimethylamino-1,4-dimethyl-8-azaquinolone-2 (Compound No. 4)

Step A. 7-Amino-2-hydroxy-4-methyl-1,8-naphthyridine was prepared by the method of Seide (O. Seide, *Chem. Ber.* 59, 2465, 1926).

Step B. Unrecrystallized 7-amino-2-hydroxy-4-methyl-1,8-naphthyridine (8.9 g) was heated under reflux with 35 ml of trimethyl phosphate at 195°–200° for 5 hr. The dark solution was cooled, diluted with 120 ml of 4N HCl, and allowed to stand 4 days at 25°. The pale yellow solid which crystallized was filtered, removing as much of the occluded liquid as possible (the filtrate was saved). The solid cake was dissolved and suspended in 50 ml of hot water, made strongly basic and cooled; the resulting tan-colored product was filtered, washed well with cold water and dried; 2.2 g (20%); m.p. 142°–144°. Recrystallization from 350 ml of cyclohexane plus 30 ml of benzene after charcoal decolorization furnished very pale yellow needles; m.p. 145.5°–146.5°.

$^1$H nmr (100 MHz, CDCl$_3$) δ2.33(d, 3H, 4-C$\underline{H}_3$, J = 1 Hz), 3.18(s, 6H), 3.72(s, 3H, 1-C$\underline{H}_3$), 6.28(q, 1H, H$_3$, J = 1 Hz), 6.40(d, 1H, H$_6$, J = 8.9 Hz), 7.68(d, 1H, H$_5$, J = 8.8 Hz).

Anal. Calcd. for C$_{12}$H$_{15}$N$_3$O: C, 66.34; H, 6.96; N, 19.34; mol. wt. 217. Found: C, 66.10; H, 6.92; N, 19.40; mol. wt. (mass spec.) 217. The picrate melted at 188°–190°; short yellow needles from ethanol.

Anal. Calcd. for C$_{18}$H$_{18}$N$_6$O$_8$: N, 18.83. Found: N, 18.79.

In one experiment a small quantity of another material was also recovered from the initial yellow solid which had precipitated from the 4N HCl solution. After recrystallization from dimethylsulfoxide it decomposed at 292°–294°. Based on the molecular weight (mass spec.) of 446 and the $^1$H nmr spectrum the following structure is assigned:

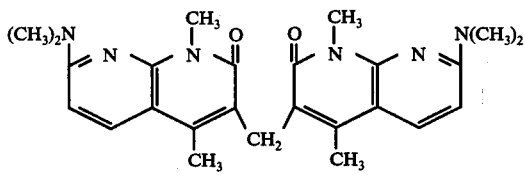

$^1$H nmr (100 MHz, Polysol) δ2.35(s, 6H, 4-C$\underline{H}_3$), 3.15(s, 12H), 3.66(s, 6H, 1-C$\underline{H}_3$), 4.09(s, 2H, bridge C$\underline{H}_2$), 6.48(d, 2H, H$_6$, J = 8.8 Hz), 7.80(d, 2H, H$_5$, J = 8.8 Hz).

Preparation of 7-methylamino-1,4-dimethyl-8-azaquinolone-2 (Compound No. 3)

The acidic mother liquors (see above) were chilled, made strongly basic and ether extracted. Evaporation of the ether, after drying over anhydrous potassium carbonate, left 14.2 g of red-orange oil plus solid, which was dissolved in 50 ml of abs. ethanol and treated with 10 ml of conc. hydrochloric acid. Yellow crystalline solid soon began to separate; after 1 hr, 50 ml of ether was added, and the product was filtered and washed with alcohol-ether, then ether; 4.4 g; m.p. 245°–255°. A second crop of much less pure material was obtained by adding more ether and cooling; 2.2 g; m.p. 220°–225°. Several recrystallizations by dissolving the salt in abs. ethanol, adding ether to initial turbidity, then allowing to stand, ultimately gave a white solid decomposing at 262°–264°, melting and shrinking at 258°–260°. This is the *hydrochloride* of 7-methyl-amino-1,4-dimethyl-8-azaquinolone-2. $^1$H nmr (100 MHz, D$_2$O) δ 2.32(s, 3H, 4-C$\underline{H}_3$), 3.70(s, 3H, 7-C$\underline{H}_3$N), 3.88(s, 3H, 1-C$\underline{H}_3$), 6.61(s, 1H, H$_3$), 6.75(d, 1H, H$_6$, J = 9.5 Hz), 8.01(d, 1H, H$_5$, J = 9.5 Hz).

Anal. Calcd. for C$_{11}$H$_{14}$ClN$_3$O: N, 17.53; Cl, 14.79. Found: N, 17.48, 17.62; Cl, 14.86, 14.76.

The picrate from ethanol melted at 255°–257°.

Anal. Calcd. for C$_{17}$H$_{16}$N$_6$O$_8$: N, 19.44. Found: N, 19.80.

The *free base* after recrystallization from n-pentane or n-hexane melted at 120°–121° after repeated melting and resolidification. Fresh samples would frequently melt completely at 80°–85°, resolidify, then remelt at 107°–113°. Two different polymorphic or tautomeric forms could be isolated which had distinctly different IR spectra (Nujol mull) but the same $^1$H nmr spectrum. One form showed a sharp unbonded NH stretch at 3200 cm$^{-1}$; the other did not show any NH stretch. The former was converted to the latter by overnight heating at 100°. $^1$H nmr (100 MHz, CDCl$_3$) δ 2.36(d, 3H, 4-C$\underline{H}_3$, J = ~ 1 Hz), 3.73(s, 3H, 7-C$\underline{H}_3$N-), 3.95(s, 3H, 1-C$\underline{H}_3$), 4.9(broad, 1H, N$\underline{H}$), 6.25(q, 1H, H$_3$, J = ~ 1 Hz), 6.36(d, 1H, H$_6$, J = 9 Hz), 7.40(d, 1H, H$_5$, J = 9 Hz).

Anal. Calcd. for C$_{11}$H$_{13}$N$_3$O: N, 20.68. Found: N, 20.01.

The phenyl thiourea of 7-methylamino-1,4-dimethyl-8-azaquinolone-2 melted at 192°–193°; yellow plates from ethanol.

Anal. Calcd. for C$_{18}$H$_{18}$N$_4$OS: N, 16.56; S, 9.47. Found: N, 16.44; S, 9.34.

Preparation of 7-amino-4-hydroxy-8-azaquinolone-2 (Compound No. 8)

The procedure used was a modification of that by Lappin et al. [G. A. Lappin, Q. R. Petersen and C. E. Wheeler, J. Org. Chem. 15, 377 (1950)]. 2,6-Diaminopyridine (10.9 g, 0.1 mole) and 16.0 g (0.1 mole) of diethyl malonate in 250 ml of diphenyl ether were heated with stirring under an air condenser at 170°–180° for 1 hr. Then the temperature was slowly increased to 245°. The total heating time from room temperature to final temperature was 4.5 hr. Off-white solid began to separate soon after 180° was reached. The slurry was cooled, diluted with 100 ml of benzene, filtered, and the solid product washed several times with benzene; 17.7 g (100%) after drying. The experiment was also readily performed on a 0.4-mole scale.

Preparation of 7-dimethylamino-4-methoxy-1-methyl-8-azaquinolone-2 (Compound No. 12)

Trimethyl phosphate (85 ml, 0.725 mole) and 32 g (0.18 mole) of the previous compound were heated under reflux in an oil bath at 195°–205° for 5 hr. The dark amber solution was cooled, diluted with 180 ml of water and extracted with two 100-ml portions of ether (which were discarded). The aqueous phase was added with stirring over 1.5 hr to a solution of 50 g of sodium hydroxide in 300 ml of water; the temperature was held at 5°–10° by cooling in an ice bath. A tan-colored solid separated; after 2 hr at 5° the solid was filtered and washed several times with cold water. Vacuum drying furnished 27.1 g of material, m.p. 100°–230°, which was successively extracted with 350-, 100- and 50-ml portions of boiling 7:3 cyclohexane-benzene. Each extract was carefully decanted from the dark, tarry insoluble residue. The combined extracts were cooled to 25° and allowed to stand several hours; the supernatant was decanted from the crystals and saved (B-1). The wet crystals were redissolved in 350 ml of fresh hot solvent mix; cooling to room temperature yielded 2.75 g (6.6%) of the title compound; m.p. 170°–176° (these mother liquors were also saved (B-2)). Another recrystallization from 250 ml of solvent mix, with charcoal decolorization, gave long white needles, which were filtered, dried, washed with two 30-ml portions of warm water and redried at 70°, 25 mm; m.p. 181°–182°. $^1$H nmr (100 MHz, CDCl$_3$), δ 3.18(s, 6H, N(CH$_3$)$_2$), 3.70(s, 3H, NCH$_3$), 3.88(s, 3H, OCH$_3$), 5.80(s, 1H, H$_3$), 6.37(d, 1H, J = 8.8 Hz, H$_6$), 7.90(d, 1H, J = 8.9 Hz, H$_5$).

Anal. Calcd. for C$_{12}$H$_{15}$N$_3$O$_2$: C, 61.79; H, 6.44; N, 18.01. Found: C, 61.73; H, 6.46; N, 18.11.

The yield was also only about 7% in several runs where 6 moles of trimethylphosphate per mole of 7-amino-4-hydroxy-8-azaquinolone-2 was employed. Doubling the heating period under these latter conditions did not seem to improve the yield.

Preparation of
7-methylamino-4-methoxy-1-methyl-8-azaquinolone-2
(Compound No. 11)

Evaporation of the second recrystallization mother liquors (B-2 above) left 3.9 g of yellow solid, m.p. 120°–130°, which was mainly 7-methyl-amino-4-methoxy-1-methyl-8-azaquinolone-2. Several recrystallizations from cyclohexane raised the m.p. to 136°–137°; feathery, white needles. $^1$H nmr (100 MHz, CDCl$_3$), δ 3.72(s, 3H, NCH$_3$), 3.88(s, 3H, OCH$_3$), 3.97(s, 3H, NCH$_3$), 5.88(s, 1H, H$_3$), 6.2-6.3(broad, one exchangeable proton), 6.27(d, 1H, J = 9.7 Hz, H$_6$), 7.33(d, 1H, J = 9.8 Hz, H$_5$); IR (Nujol mull), 3280 cm$^{-1}$ (NH).

Anal. Calcd. for C$_{11}$H$_{13}$N$_3$O$_2$: C, 60.26; H, 5.98; N, 19.17; mol. wt. 219. Found: C, 60.37; 60.15; H, 5.96, 6.13; N, 19.17, 19.12; mol. wt. (mass spec.) 219.

The perchlorate of the 7-methylamino derivative decomposed at 263°–265° after recrystallization from water.

Anal. Calcd. for C$_{11}$H$_{14}$ClN$_3$O$_6$: C, 41.32; H, 4.41; N, 13.14. Found: C, 42.15; H, 4.35; N, 13.18.

The dimethyl phosphate salt of the 7-methylamino derivative was obtained occasionally as an impurity in the crude 7-dimethylamino compound; it could be separated by water extraction. After recrystallization from benzene plus some ethanol it melted at 213°–215°; white, feathery needles. The $^1$H nmr is consistent with this assignment.

Anal. Calcd. for C$_{11}$H$_{13}$N$_3$O$_2$.(CH$_3$O)$_2$PO(OH): C, 45.22; H, 5.84; N, 12.17; P, 8.97. Found: C, 45.26; H, 5.59; N, 12.32; P, 9.19.

Evaporation of the initial recrystallized mother liquors (B-1) left 14.3 g of solid melting at 80°–120°. Although this fraction also contained substantial amounts of the 7-methylamino derivative, chromatography on 2:1 silicic acid-Celite, using ethyl acetate as the eluent, furnished a small quantity of a compound melting at 164°–166° after recrystallization from cyclohexane. The analyses, $^1$H nmr and mass spectrum, are consistent with either of the following structures:

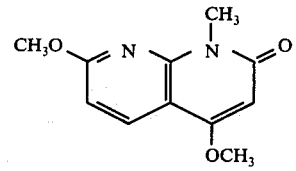

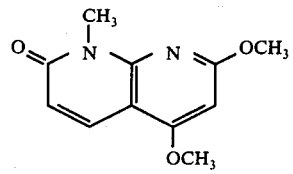

$^1$H NMR (60 MHz, CDCl$_3$), δ 3.72(s, 3H, NCH$_3$), 3.92(s, 3H, OCH$_3$), 4.03(s, 3H, OCH$_3$), 5.92(s, 1H, H$_3$), 6.54(d, 1H, J = 8.5 Hz, H$_6$), 8.08(d, 1H, J = 8.5 Hz, H$_5$).

Anal. Calcd. for C$_{11}$H$_{12}$N$_2$O$_3$: C, 59.99; H, 5.49; N, 12.72; mol. wt. 220. Found: C, 59.26; H, 5.41; N, 12.87; mol. wt. (mass spec.) 220.

Preparation of 7-amino-4-methoxy-8-azaquinolone-2
(Compound No. 10)

To a stirred slurry of 8.9 g (0.05 mole) of 7-amino-4-hydroxy-8-azaquinolone-2 (Compound No. 9 above), 2.0 g (0.05 mole) of sodium hydroxide, 10.6 g (0.1 mole) of sodium carbonate and 8.4 g (0.1 mole) of sodium bicarbonate in 100 ml of water and 50 ml of ethanol was added dropwise over 25 min 25.2 g (19 ml, 0.2 mole) of dimethyl sulfate. The temperature was held at 28°–30° by cooling. After stirring for 1 hr at 29°, 50 ml more of ethanol was added, and the mixture was refluxed (with continued stirring) for 5 hr, cooled and diluted with 100 ml of water. The solid was filtered, washed well with water and dried; 6.5 g; m.p. above 320°. One g was dissolved in 250 ml of hot dimethyl sulfoxide, filtered, treated with 40 ml of ethanol and cooled; the powdery product was filtered, washed well with water and dried. $^1$H nmr (DMSO-d$_6$, 100 MHz), δ 3.85(s, 3H, OCH$_3$), 5.55(s, 1H, H$_3$), 6.31(d, 1H, J = 8.7 Hz, H$_6$), 7.70(d, 1H, J = 8.7 Hz, H$_5$).

Anal. Calcd. for C$_9$H$_9$N$_3$O$_2$: C, 56.54; H, 4.79; N, 21.98. Found: C, 56.31; H, 4.73; N, 21.94.

When the original aqueous mother liquors and washings were diluted with more water, cooled, filtered from trace of amorphous material, and ether extracted, there was recovered from the extracts 0.19 g of pale yellow solid, partially melting at 220°–230°, the remainder at 270°–275°. A rough separation was effected by dissolving in a hot mixed solvent consisting of 7 ml of cyclohexane, 8 ml of benzene and 3 ml of ethanol. The first material to crystallize decomposed at 280°–300° and its $^1$H nmr spectrum suggested that it was mainly 7-amino-3-methyl-4-methoxy-8-azaquinolone-2. $^1$H nmr (DMSO-d$_6$, 100 MHz), δ 1.95(s, 3H, C-CH$_3$), 3.83(s, 3H, OCH$_3$), 6.38(d, 1H, J = 8.5 Hz, H$_6$), 7.67(d, 1H, J = 8.8 Hz, H$_5$). The next crop by cooling to 5° was a mixture. After removing it, hexane was added to the filtrate; further cooling gave yellow crusts melting at 283°–240°. A mass spectrum showed a parent peak at m/e = 219 (corresponding to a trimethylated product); however, the $^1$H nmr suggested a mixture of closely related di- and trimethylated materials (3 pairs of peaks with an 8-Hz splitting for both H$_5$ and H$_6$). This fraction, in addition to a C-methyl at δ 1.94, also had a C-methyl at δ 1.29

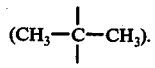

Preparation of 7-dimethylamino-4-hydroxy-1-methyl-8-azaquinolone-2 (Compound No. 15)

7-Dimethylamino-4-methoxy-1-methyl-8-azaquinolone-2 (Compound No. 13 above) was slurried with 10 ml of 4N hydrochloric acid. There was a rapid and complete solution of the amine, followed by precipitation of a thick paste of white crystals (probably the hydrochloride). All of the latter dissolved when the solution was warmed on the steam bath. Upon overnight heating the reaction flask again filled with another mass of white crystals; these were filtered, washed with two 5-ml portions of water and dried; 0.9 g. Recrystallization from 15 ml of DMSO gave a compound melting at 297°–299°. The evidence suggests 7-dimethylamino-4-hydroxy-1-methyl-8-azaquinolone-2. IR (mull) 1630 cm$^{-1}$ (CO). $^1$H nmr (DMSO-d$_6$, 60 MHz), δ 3.12(s, 6H, (C$\underline{H}_3$)$_2$N), 3.50(s, 3H, NC$\underline{H}_3$), 5.60(s, 1H, H$_3$), 6.50(d, 1H, H$_6$, J = 8.5 Hz), 7.85(d, 1H, H$_5$, J = 8.5 Hz).

Anal. Calcd. for C$_{11}$H$_{13}$N$_3$O$_2$: C, 60.26; H, 5.98; N, 19.17. Found: C, 60.29, 60.17; H, 5.97, 5.92; N, 19.16, 18.95.

The hydrochloride of the previous compound melted at 276°–281° after recrystallization from DMSO.

Anal. Calcd. for C$_{11}$H$_{14}$ClN$_3$O$_2$: N, 16.43; Cl, 13.86. Found: N, 16.58; Cl, 12.80.

A similar acid hydrolysis of a very impure sample furnished, in addition, another compound which decomposed at 287°–289°, after recrystallization from water. This compound is the hydrochloride of 7-amino-4-hydroxy-1-methyl-8-azaquinolone-2 or a tautomer. IR (mull) 3450 cm$^{-1}$ (sharp, unbonded OH), 3150, 3050, 1680 (CO), 1630 (CO). $^1$H nmr (DMSO-d$_6$ 60 MHz), δ 3.85(s, 3H, NC$\underline{H}_3$), 6.42(s, 1H, H$_3$), 6.86(d, 1H, H$_6$, J = 8.5 Hz). 8.20(d, 1H, H$_5$, J = 8.5 Hz), 8.9–9.3(broad, 1H, N$\underline{H}$).

Anal. Calcd. for C$_9$H$_{12}$N$_3$O$_3$.HCl.H$_2$O: C, 43.82; H, 4.91; N, 17.04; Cl, 14.37. Found: C, 43.92; H, 4.73; N, 17.11; Cl, 14.29.

Preparation of 7-amino-3,4-dimethyl-8-azaquinolone-2 (Compound No. 2)

2,6-Diaminopyridine (10.9 g, 0.1 mole) and 14.4 g (0.1 mole) of ethyl 2-methylacetoacetate were mixed and heated for 16 hr in an oil bath at 150°–160°. The cooled mass was digested with 25 ml of ethanol, chilled to 5°, and filtered. The cake was washed twice with small amounts of very cold ethanol since the product appeared to be fairly soluble. When the dried product (8.9 g) was boiled with 200 ml of ethanol, there was left 2.7 g (14%) of 7-amino-3,4-dimethyl-8-azaquinolone-2; m.p. > 320°. (Cooling the alcoholic extracts to −15° gave bright yellow needles, m.p. 134°–146°, after initial melting and resolidification at 116°–122°; the IR and $^1$H nmr spectra suggest that this material is the substituted acetoacetamide). One g was purified by heating to boiling with 300 ml of water, adding 35 ml of conc. hydrochloric acid, filtering, diluting the filtrate with 100 ml of water and cooling to 5°. The product was filtered, washed with water and vacuum-dried (70°, 25 mm).

Anal. Calcd. for C$_{10}$H$_{11}$N$_3$ON, 22.21. Found: N, 22.17.

Preparation of 7-methylamino-1,3,4-trimethyl-8-azaquinolone-2 (Compound No. 5)

7-Amino-3,4-dimethyl-8-azaquinolone-2 (7.7 g) was slurried with 10 ml of trimethyl phosphate and heated at 192°–200° for 6 hr. Almost 4 hr were required for the solid to dissolve completely. The cooled viscous mixture was dissolved in 45 ml of 4N hydrochloric acid and extracted with 75 ml of ether to remove trimethyl phosphate. The aqueous phase was made basic and extracted three times with 75-ml portions of ether (the aqueous phase was saved; see B-5 below). After drying over anhydrous potassium carbonate, the ether was evaporated to leave 4.38 g of amber oil, which was dissolved in 20 ml of 1:1 benzene-cyclohexane. Cooling gave some yellow-orange solid (B-1), which was removed; the filtrate (B-2) was saved. The solid (B-1) after recrystallization from the same solvent mixture was obtained as pale yellow felted needles; m.p. 166°–168°. The analysis and $^1$H nmr are consistent with those expected for the following water-soluble salt of 7-methylamino-1,3,4-trimethyl-8-azaquinolone-2: 2(C$_{12}$H$_{15}$N$_3$O).(CH$_3$O)PO(OH)$_2$.1.5 H$_2$O. $^1$H nmr (CDCl$_3$), δ 2.16(s, 6H, C-C$\underline{H}_3$), 2.38(s, 6H, C-C$\underline{H}_3$), 3.69(d, 3H, C$\underline{H}_3$OP, J = 11 Hz), 3.97(s, 6H, NC$\underline{H}_3$), 4.02(s, 6H, NC$\underline{H}_3$), 7.03(d, 2H, H$_6$, J = 9 Hz), 7.65(d, 2H, H$_5$, J = 9 Hz), 8.6–8.9(broad, 2H, N$\underline{H}$, exchanges with D$_2$O).

The free 7-methylamino-1,3,4-trimethyl-8-azaquinolone-2 melted at 133°–134° after recrystallization from cyclohexane. $^1$H NMR (CDCl$_3$), δ 2.12(s, 3H, C-C$\underline{H}_3$), 2.32(s, 3H, C-C$\underline{H}_3$), 3.73(s, 3H, NC$\underline{H}_3$), 3.98(s, 3H, NC$\underline{H}_3$), 5.6–6.0(broad, 1H, N$\underline{H}$), 6.38(d, 1H, H$_6$, J = 9 Hz), 7.23(d, 1H, H$_5$, J = 9 Hz).

Preparation of 4-methyl-7-amino-5,8-diazaquinolone-2 (3-amino-8-methyl-6-oxo-6,7-dihydropyrido [2,3-b] pyrazine)

Step A. Preparation of 2,6-diaminopyrazine. 2,6-Dichloropyrazine (10 g), copper sulfate (1.0 g) and concentrated aq. ammonia (100 ml) were heated for 24 hr at 160° in a steel bomb. The mixture was evaporated to dryness and reevaporated with dry ethanol. The dark solid was extracted with hot ethanol, which was then evaporated, and the residue was recrystallized from toluene (500 ml) using decolorizing charcoal, 1.2 g (16%); m.p. 137°–137.5°. The mass spectrum shows a strong parent peak at 110.

Anal. Calcd. for C$_4$H$_6$N$_4$: C, 43.7; H, 5.46; N, 50.9. Found: C, 43.69; H, 5.40; N, 50.85.

Step B. 2,6-Diaminopyrazine (0.35 g) and 0.41 g of ethyl acetoacetate were heated at 150°–160° for 18 hr. The cooled, dark red, viscous mass was triturated with 5 ml of ethanol; the solid product was filtered, washed twice with cold ethanol and dried; 0.31 g (52%). The very poorly soluble compound could be recrystallized from hot DMSO.

Anal. Calcd. for C$_8$H$_8$N$_4$O.0.5H$_2$O: N, 30.26 Found: N, 30.44.

Additional compounds illustrative of the present invention are those of the following structures:

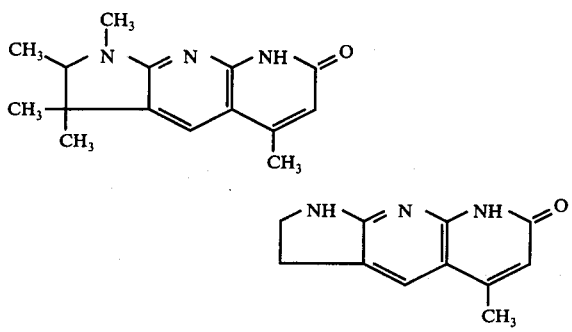

The present compounds were examined for lasing using a Phase-R Corporation DL-5 (0.5-cm-diam.) coaxial flashlamp triggered by means of an EG&G, Inc. HY-3202 Thyratron to give typically 200-nsec rise time (10 to 90%) 500-nsec full-width half-maximum (FWHM) pulses (short-pulse operation). The laser cavity was equipped with a 3- or 4-meter-radius spherical mirror 29 cm from a 90% reflectivity output mirror. Antireflection coatings were employed on the output mirror and cell windows. Dye concentrations producing an absorbance of 4 cm$^{-1}$ were used. In some cases, the solution was saturated with oxygen or an inert gas.

Long-pulse operation was achieved by connecting the Phase-R flashlamp to a Candela Corporation Ed-625 electric driver, which used a 1.5-$\mu$F capacitor and a spark-gap switch. Rise times varied from 400 nsec at 70 joules and higher energy to 800 nsec at 40 joules, whereas pulse width was around 2 $\mu$sec independent of input.

Laser output was monitored on a Tektronix, Inc., 7844 dual-beam oscilloscope using a United Detector Technology, Inc., PIN-6LC Schottky barrier photodiode, a Laser Precision Corporation Rk-3232 energy ratiometer, and an Interactive Technology one-meter f/8.4 monochromator. Fluorescence spectra and quantum yields were measured on a G. K. Turner Model 210 spectrofluorometer.

The lasing properties under flashlamp excitation of the present azaquinolone-2 compounds as compared with the quinolone-2 analogs are given in Table 2.

present azaquinolones are substantially blue-shifted with respect to the corresponding quinolones.

A major and important advantage of the present lasing dyes is that these dyes will produce long pulses under long pulse excitation. Consequently the present lasing dyes are capable of operating CW (continuous wave).

The output wavelength of the present dye lasers can be tuned by changing some parameter in the system in accordance with well known procedures, for example a grating, a prism or an etalon. The central wavelength also depends on the choice of solvent, optical path length, pump energy and concentration.

An advantage of the present dye lasers is that different kinds of pumps can be used to make the dye solution lase. For example, either a nitrogen laser or a flashlamp can be used as a pump.

Although the invention has been hereinbefore described with respect to specific examples, it will be appreciated that various changes and modifications will occur to those skilled in the art without departing from the spirit of the invention. Therefore, it is not intended to limit the invention except by the terms of the following claims.

What we claim is:

1. A dye laser comprising a laser dye solution and a pumping energy source operably coupled therewith and capable of producing stimulated emission of the dye solution, said solution comprising a lasing concentration in a non-interfering solvent, of a dye having the following formula:

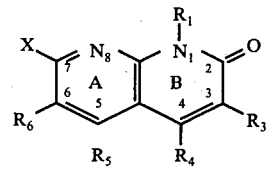

wherein $R_1$ is hydrogen or methyl; $R_3$ is hydrogen or methyl; $R_4$ is hydrogen, hydroxy, methoxy, methyl, or trifluoromethyl; $R_5$ and $R_6$ are hydrogen; and X is hydroxy, amino, methylamino, or dimethylamino,.

2. A dye laser according to claim 1 wherein the lasing

TABLE 2.

| Compound | Threshold, J | Slope Efficiency $\times 10^3$ | Center of Lasing Range, nm | Stability[b] |
|---|---|---|---|---|
| Lasing Properties of 8-Azaquinolone-2 and Quinolone-2 Dyes.[a] | | | | |
| 7-Hydroxy-4-methyl-8-azaquinolone-2 | 22 | 0.10 | 395 | M |
| 7-Hydroxy-4-methylquinolone-2[c] | 24 | 0.05 | 441 | L |
| 7-Hydroxy-3,4-dimethyl-8-azaquinolone-2[c] | 40 | 0.05 | 405 | L |
| 7-Hydroxy-3,4-dimethylquinolone-2[c] | 20 | 0.40 | 447 | H |
| 7-Amino-4-methyl-8-azaquinolone-2 | 40 | 0.02 | 386 | L |
| 7-Amino-4-methylquinolone-2 | 18 | 0.15 | 413 | L |
| 7-Dimethylamino-1,4-dimethyl-8-azaquinolone-2 | 14 | 0.20 | 407 | H |
| 7-Dimethylamino-1,4-dimethylquinolone-2 | 12 | 0.25 | 420 | H |
| 7-Dimethylamino-1-methyl-4-methoxy-8-azaquinolone-2 | 20 | 0.10 | 390 | H |
| 7-Dimethylamino-1-methyl-4-methoxyquinolone-2[d] | 40 | 0.02 | 409 | H |
| 7-Dimethylamino-1-methyl-4-trifluoromethyl-8-azaquinolone-2 | — | — | 430[e] | — |
| 7-Dimethylamino-1-methyl-4-trifluoromethylquinolone-2- | — | — | 472[e] | — |
| 7-Amino-4-trifluoromethyl-8-azaquinolone-2 | 28 | 0.15 | 437 | L |

[a]Ethanol solution saturated with air
[b]Stability: high, H; medium, M; low, L
[c]Measured in 10$^{-3}$ N NaOH/ethanol
[d]Measured as the hydrochloride in 10$^{-4}$N NaOH.
[e]Fluorescence Maxima Thresholds and slope efficiencies for the present azaquinolone dyes and the corresponding quinolones are comparable. However, fluoroescence maxima of the dye is 7-dimethylamino-1-methyl-4-methoxy-8-azaquinolone-2.

3. A dye laser according to claim 1 wherein the lasing dye is 7-hydroxy-4-methyl-8-azaquinolone-2.

4. A dye laser according to claim 1 wherein the lasing dye is 7-hydroxy-3,4-dimethyl-8-azaquinolone-2.

5. A dye laser according to claim 1 wherein the lasing dye is 7-amino-4-methyl-8-azaquinolone-2.

6. A dye laser according to claim 1 wherein the lasing dye is 7-dimethylamino-1,4-dimethyl-8-azaquinolone-2.

7. The dye laser according to claim 1 wherein the lasing dye is 7-dimethylamino-1-methyl-4-trifluoromethyl-8-azaquinolone-2.

8. A dye laser according to claim 1 wherein the lasing dye is 7-amino-4-trifluoromethyl-8-azaquinolone-2.

9. A method for producing a coherent laser beam which comprises stimulating the emission of energy from molecules of a lasing compound having the following formula:

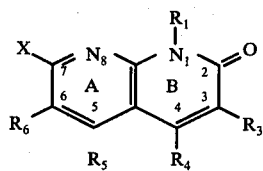

wherein $R_1$ is hydrogen or methyl; $R_3$ is hydrogen or methyl; $R_4$ is hydrogen, hydroxy, methoxy, methyl, or trifluoromethyl,; $R_5$ and $R_6$ are hydrogen; and X is hydroxy, amino, methylamino, or dimethylamino,.

10. A method according to claim 9 wherein the lasing compound is 7-dimethylamino-1-methyl-4-methoxy-8-azaquinolone-2.

11. A method according to claim 9 wherein the lasing compound is 7-hydroxy-4-methyl-8-azaquinolone-2.

12. A method according to claim 9 wherein the lasing compound is 7-hydroxy-3,4-dimethyl-8-azaquinolone-2.

13. A method according to claim 9 wherein the lasing compound is 7-amino-4-methyl-8-azaquinolone-2.

14. A method according to claim 9 wherein the lasing compound is 7-dimethylamino-1,4-dimethyl-8-azaquinolone-2.

15. A method according to claim 9 wherein the lasing compound is 7-dimethylamino-1-methyl-4-trifluoromethyl-8-azaquinolone-2.

16. A method according to claim 9 wherein the lasing compound is 7-amino-4-trifluoromethyl-8-azaquinolone-2.

17. A method according to claim 9 wherein stimulated emission is achieved by optically pumping a laser gain medium comprising an amount of said lasing compound effective for the support of lasing in a non-interfering solvent to produce an energy population inversion in the lasing compound sufficient for laser action and stimulating the production of said laser beam in an optically resonant cavity.

* * * * *